United States Patent [19]

Coplin et al.

[11] 4,428,713

[45] Jan. 31, 1984

[54] TURBINE

[75] Inventors: John F. Coplin; Edward S. Hadaway, both of Duffield, England

[73] Assignee: Rolls-Royce Limited, London, England

[21] Appl. No.: 465,457

[22] Filed: Feb. 10, 1983

Related U.S. Application Data

[63] Continuation of Ser. No. 210,259, Nov. 25, 1980, abandoned.

[30] Foreign Application Priority Data

Dec. 6, 1979 [GB] United Kingdom ................. 7942156

[51] Int. Cl.³ ....................... F01D 25/12; F01D 25/16
[52] U.S. Cl. .................................... 415/48; 415/116; 415/142; 415/180
[58] Field of Search ................. 415/138, 142, 47, 175, 415/139, 176, 180, 178, 13, 116

[56] References Cited

U.S. PATENT DOCUMENTS

| | | | |
|---|---|---|---|
| 2,651,492 | 9/1953 | Feilden | 415/178 X |
| 2,744,941 | 5/1956 | Orr | 415/115 |
| 2,869,821 | 1/1959 | Halford et al. | 415/139 |
| 2,869,941 | 1/1959 | Shoup, Jr. et al. | 415/170 R X |
| 2,928,648 | 3/1960 | Haines et al. | 415/138 |
| 3,250,512 | 5/1966 | Petrie | 415/135 |
| 3,261,587 | 7/1966 | Rowley et al. | 415/138 |
| 3,312,448 | 4/1967 | Hull, Jr. et al. | 415/175 |
| 3,544,231 | 12/1970 | Zerlauth | 415/180 X |
| 3,975,901 | 8/1976 | Hallinger et al. | 415/117 |
| 3,982,850 | 9/1976 | Jenkinson | 415/178 |
| 4,213,296 | 7/1980 | Schwarz | 415/116 |
| 4,242,042 | 12/1980 | Schwarz | 415/116 |

FOREIGN PATENT DOCUMENTS

| | | | |
|---|---|---|---|
| 2528084 | 6/1974 | Fed. Rep. of Germany | 415/175 |
| 699206 | 11/1979 | U.S.S.R. | 415/47 |
| 730984 | 5/1980 | U.S.S.R. | 415/176 |

Primary Examiner—Philip R. Coe
Assistant Examiner—Frankie L. Stinson
Attorney, Agent, or Firm—Cushman, Darby & Cushman

[57] ABSTRACT

A turbine suitable for a gas turbine engine is provided with a bearing support member which is interconnected with the turbine casing by means of an annular array of aerofoil guide vanes. The whole assembly of support member and aerofoil guide vanes is maintained in a state of tension. The degree of tension in the assembly is controlled so as to be substantially constant throughout the normal operating cycle of the turbine.

17 Claims, 6 Drawing Figures

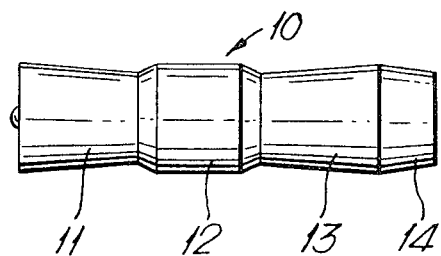
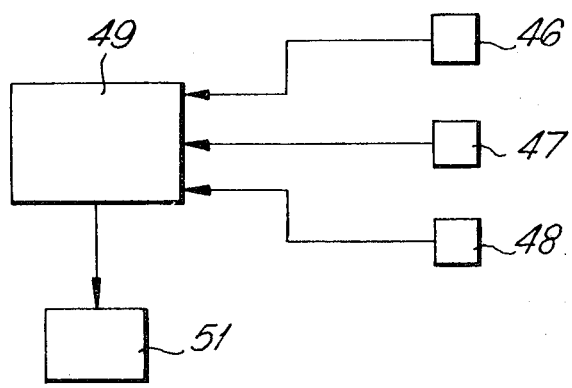

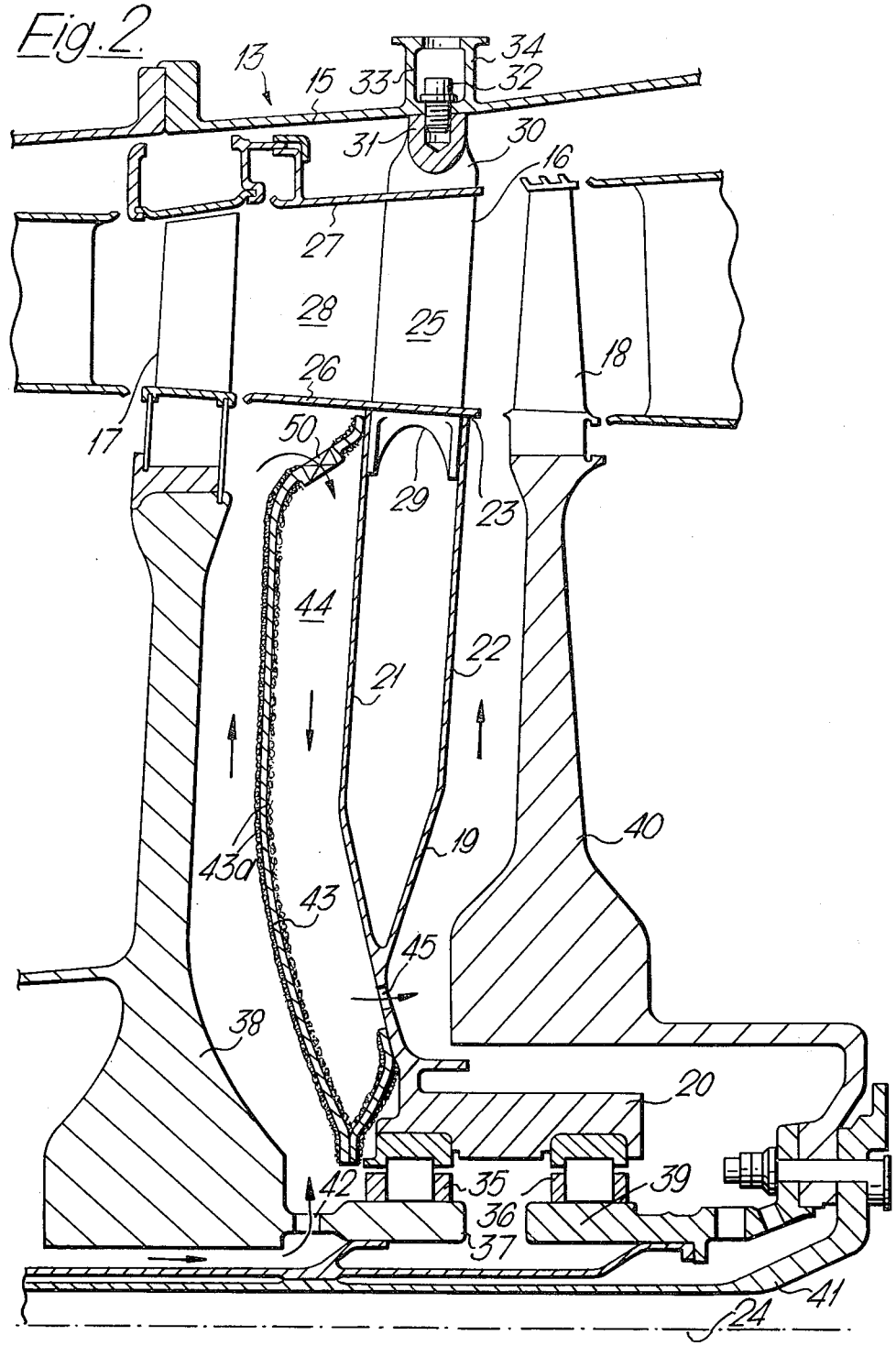

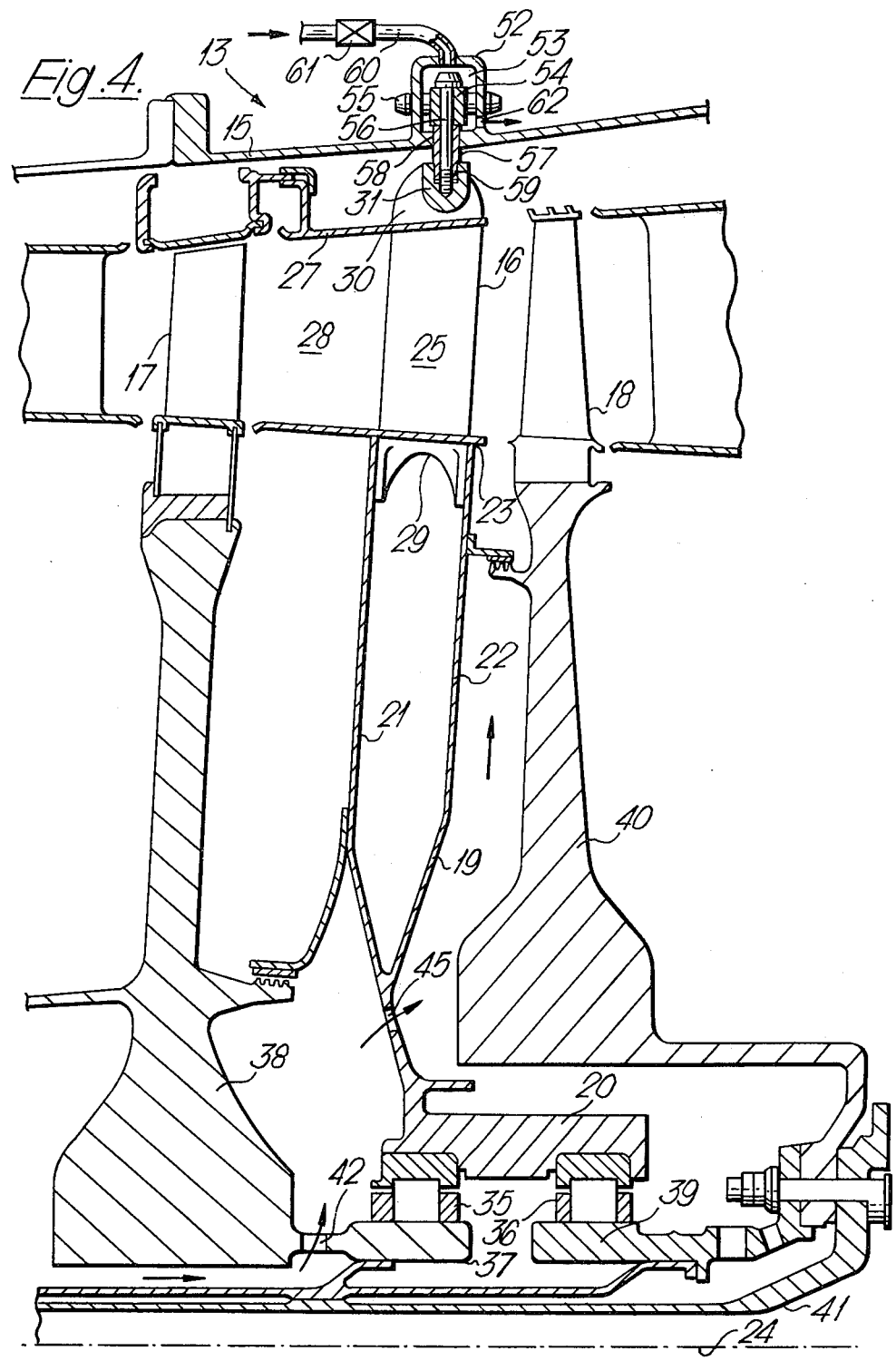

TURBINE

This is a continuation of application Ser. No. 210,259, filed Nov. 25, 1980, and now abandoned.

This invention relates to turbines and in particular to turbines suitable for gas turbine engines.

Turbines suitable for gas turbine engines conventionally comprise alternate annular arrays of stator vanes and rotor aerofoil blades positioned in flow series. Each aerofoil vane of each of the stator stages may be fixed at its radially outer extent to the casing of the turbine and at its radially inner extent to a support member having a hub portion adapted to carry one or more bearings. The bearings are adapted in turn to support one or more shafts which carry the turbine rotor portions.

It is commonly found with such turbine arrangements that during engine operation, the differing rates of thermal expansion of the various turbine components result in the bearing support member being subject to loads in bending. Consequently bending loads are imposed upon the stator aerofoil vanes as they transfer the bearing support member loads to the turbine casing. It has been found necessary therefore to ensure that the stator aerofoil vanes are sufficiently robust to carry these loads without distorting to such an extent that their aerodynamic characteristics are affected.

An alternative solution to this problem has been to provide struts which extend through the stator aerofoil vanes to interconnect the bearing support member with the turbine casing. The struts carry the bending loads, thereby ensuring that the stator aerofoil vanes are free of those loads. Consequently although the stator aerofoil vanes may be of less robust construction, they must, nevertheless, be of such a size that they are capable of accommodating the struts. This usually results in the stator aerofoil vanes having to be larger than in fact they need be from an aerodynamics point of view.

It is an object of the present invention to provide a turbine suitable for a gas turbine engine in which such compromises in stator aerofoil vane configuration and construction are avoided.

According to the present invention, a turbine suitable for a gas turbine engine comprises a casing enclosing a support member having a hub portion and a generally circular periphery, said support member being symmetrically disposed about the axis of said turbine with the axis of said hub portion coaxial with said turbine axis, an annular array of radially extending stator aerofoil vanes, each of which is attached to both said casing and the periphery of said support member, and means adapted to maintain both said support member and said stator aerofoil vanes in a substantially constant state of tension.

Said means adapted to maintain both said support member and said stator aerofoil vanes in a substantially constant state of tension may comprise means adapted to vary the tension in said support member and said stator aerofoil vanes, means adapted to monitor the degree of tension in each of said support member and said stator aerofoil vanes, and control means associated with said tension varying means and said tension monitoring means, said control means being adapted to control said tension varying means so as to maintain said support member and said stator aerofoil vanes in said substantially constant state of tension.

Said means adapted to monitor the degree of tension in said support member and said stator aerofoil vanes may comprise means adapted to monitor the temperatures of said support member and said stator aerofoil vanes and means adapted to compute therefrom the degree of tension in said support member and said stator aerofoil vanes.

Said means adapted to compute the degree of tension in said support member and said stator aerofoil vanes may be incorporated in said control means.

Said means adapted to monitor the degree of tension in said support member and said stator aerofoil vanes alternatively comprise a plurality of strain gauges.

Said control means may include a microprocessor.

Said means adapted to vary the tension in said support member and stator aerofoil vanes may comprise fluid flow regulating means adapted to direct a flow of cooling fluid to said support member, said control means being adapted to control said fluid flow regulating means in such a manner that the flow rate of cooling fluid directed onto said support member is such that the temperature of said support member is regulated in such a manner as to maintain said substantially constant state of tension in said support member and said stator aerofoil vanes.

At least a portion of said support member is preferably encased by a shroud member so that at least one chamber is defined adjacent said support member, said fluid flow regulating means being adapted to direct said cooling fluid into said at least one chamber to regulate the temperature of said support member.

Said cooling fluid is preferably air.

Said shroud member is preferably provided with a thermally insulating coating.

Each of said stator aerofoil vanes may alternatively be associated with means adapted to exert a variable tensile load thereon.

Said means adapted to exert a variable tensile load on each of said stator aerofoil vanes preferably interconnects each of said stator aerofoil vanes with said turbine casing.

Said means adapted to exert a variable tensile load on each of said stator aerofoil vanes may be a screw-jack.

Said means adapted to exert a variable tensile load on each of said stator aerofoil vanes may alternatively comprise a generally ring shaped member, each of said stator aerofoil vanes being attached to said casing via said ring-shaped member, said ring-shaped member being attached to said turbine casing by means adapted to permit radial thermal expansion and contraction of said ring-shaped member independently of said turbine casing, and fluid flow regulating means adapted to direct a flow of cooling or heating fluid onto said ring-shaped member, said control means being adapted to control said fluid flow regulating means in such a manner that the flow rate of said cooling or heating fluid directed onto said ring-shaped member is such that the temperature of said ring-shaped member is regulated in such a manner that said aerofoil stator vanes and said support member are maintained in a substantially constant state of tension thereby.

Said ring-shaped member is preferably enclosed within a hollow annular member, said cooling or heating fluid being directed into the interior of said member.

Said ring-shaped member is preferably located externally of said turbine casing.

Said hub portion of said support member is preferably adapted to carry at least one bearing member which is adapted in turn to support at least one shaft.

The invention will now be particularly described with reference to the accompanying drawings in which:

FIG. 1 is a side view of a gas turbine engine provided with a turbine in accordance with the present invention.

FIG. 2 is a sectioned side view of a portion of the turbine of the gas turbine engine shown in FIG. 1.

FIG. 2a is a fragmentary sectional side view disclosing a modification of the tensioning means.

FIG. 3 is a diagrammatic representation of the tension monitoring and control system for the stator portion of the turbine shown in FIG. 2.

FIG. 3a is a diagrammatic view similar to FIG. 3 but illustrating a modification wherein strain gauges are utilized instead of thermocouples.

FIG. 4 is a sectioned side view of a portion of the turbine of the gas turbine engine shown in FIG. 1 showing a further embodiment of the present invention.

With reference to FIG. 1 an axial flow gas turbine engine generally indicated at 10 comprises in flow series a compressor section 11, combustion equipment 12, a turbine section 13 and a propulsion nozzle 14. The gas turbine engine 10 functions in the conventional manner, that is, air compressed in the compressor section 11 is mixed with fuel and the mixture combusted in the combustion equipment 12 and expanded through the turbine 13 to atmosphere via the propulsion nozzle 14.

The turbine section 13 comprises alternate annular arrays of rotor aerofoil blades and stator aerofoil vanes arranged in axial flow series within a casing 15. A portion of the turbine 13 can be seen in FIG. 2 and comprises a stage of stator aerofoil vanes 16 interposed between two stages 17 and 18 of rotor aerofoil blades.

The stator aerofoil vane stage 16 comprises a generally disc shaped support member 19 which is provided with a hub portion 20 at its centre and two flange-like portions 21 and 22 which extend radially outwards to terminate in a generally circular periphery 23. The support member 19 is disposed symmetrically about the axis 24 of the turbine 13 with the axis of the hub portion 20 coaxial with the turbine axis 24.

An annular array of aerofoil vanes 25 is attached to the periphery 23 of the support member 19. Each aerofoil vane 25 is provided with radially inner and outer platforms 26 and 27 respectively so that the platforms 26 and 27 of adjacent aerofoil vanes cooperate to define radially inner and outer walls which constitute an axial portion of the gas passage 28 through the turbine 13.

The radially inner end of each aerofoil vane 25 is provided with a root portion 29 which locates between and is secured to the flange-like support member portions 21 and 22. The radially outer end of each aerofoil vane 25 is provided with a webbed piece 30 which carries a boss 31. The boss 31 abuts the turbine casing 13 and is attached thereto by means of a bolt 32. The turbine casing 13 is strengthened each side of the array of bolts 32 by the provision of two axially spaced apart supporting rings 33 and 34.

The hub portion 20 of the support member 19 carries two axially spaced apart bearings 35 and 36. The bearing 35 supports a shaft 37 which carries the disc 38 of the rotor aerofoil blade stage 17. The other bearing 36 supports a shaft 39 to which is attached the disc 40 of the rotor aerofoil blade stage 18. The shaft 39 is also attached to a further shaft 41 which interconnects the turbine stage 18 with a portion of the compressor section 11 of the engine 10.

The shaft 37 is provided with a series of apertures 42 which permit the flow of cooling air derived from the compressor section 11 into the space between the rotary blade stage 17 and the support structure 19. A shroud member 43 having a thermal barrier coating 43a is attached to the support member 19 so that the cooling air flows in the direction indicated by the arrows towards the platforms 26, thereby providing a certain degree of cooling of the disc 38. At the radially outer region of the shroud member 43 there are provided a plurality of air flow regulators 50 which permit the flow of the cooling air into a chamber 44 which is defined between the shroud member 43 and the support member 19. The cooling air passes through the chamber 44, thereby cooling the support structure 19 and is then exhausted from the chamber 44 via a plurality of apertures 45 so as to provide further cooling of the support structure 19 and also the disc 40 before being exhausted into the gas stream 28.

The dimensions of the support member 19 and aerofoil vane 25 are chosen such that they are maintained in tension at normal turbine operating temperatures.

The support member 19, some of the aerofoil vanes 25 and some of the aerofoil bosses 31 are provided with thermocouples 46, 47 and 48 which are shown diagrammatically in FIG. 3. The thermocouples are so distributed about these components 19, 25 and 31 that they provide a representative indication of their temperatures. The output signals from the thermocouples 46, 47 and 48 are fed into a processing unit 49 which includes a microprocessor. The processing unit 49 is programmed with information relating to the coefficients of thermal expansion of the aerofoil vanes 25, their webs and bosses 30 and 31 and the support member 19 as well as other constants relating to their physical properties. From this information, the processing unit 49 is adapted to compute the degree of tension in the aerofoil vanes 25 and the support structure 19.

The processing unit 49 is also adapted to provide an output signal which is proportional to the previously mentioned computed degree of tension and is fed to a unit 51 adapted to actuate the air flow regulators 50 provided on the shroud member 43. More specifically the processing unit 49 is adapted to provide an output signal to the actuating unit 51 which results in the air flow regulators 50 providing sufficient cooling air within the chamber 44 to maintain the support member 19 at a temperature consistent with the aerofoil vanes 25 and the support member 19 being maintained in a substantially constant state of tension.

As previously stated the support member 19 and the aerofoil vanes 25 are so dimensioned as to be maintained in tension at normal turbine operating temperatures. In order that as little cooling air as possible is used in cooling the support structure 19, cooling air is only permitted to enter the chamber 44 when there is an increase in turbine temperature over the normal turbine operating temperature. Thus in the event of an increase in turbine temperature, cooling air flows into the chamber 44, thereby cooling the support structure 19 so that it contracts to maintain a constant degree of tension in the support structure 19 and the aerofoil blades 25.

Since the aerofoil vanes 25 and support members 19 are maintained in a substantially constant state of tension over a range of turbine operating temperatures, it is possible to make them smaller and less robust than similar structures subject to variable degrees of compression without prejudicing their strength and effectiveness. Indeed since they are not required to carry bending loads, they may be of the optimum size and configuration consistent with their aerodynamic function.

It may be found under certain operating conditions that the single shroud member 43 provides insufficient cooling of the support member 19. If this is so, it may be necessary to provide a further similar shroud member on the downstream face of the support member 19. This would define a second chamber adjacent the support member 19 into which cooling air from the apertures 45 could be directed.

It is envisaged that alternative means could be used to maintain the support member 19 and the aerofoil vanes 25 in a substantially constant state of tension during turbine operation. Thus for instance, the bolts 32 (FIG. 2) could be made in the form of screw-jacks 32' (FIG. 2a) adapted to exert a tensile load upon each of the aerofoil vanes 25 and thus the support member 19. It would be necessary therefore for the actuating unit 51 to be adapted to actuate these screw-jacks in accordance with the signals from the processing unit 49. Such an arrangement could replace the use of cooling air in tension control or alternatively be used in conjunction with it. The arrangement would, of course, necessitate the provision of appropriate clearance gaps 31' between each of the bosses 31 and the turbine casing 15.

A further alternative means for maintaining the support member 19 and the aerofoil vanes 25 in a substantially constant state of tension is illustrated in FIG. 4. In that drawing, components common with those of previously described embodiments have been given the same reference numbers. With reference to FIG. 4, the turbine casing 15 is modified in the region of the radially outer regions of the aerofoil stators 25 by the provision of a generally U-shaped cross-section member 52. The U-shaped cross-section member 52 is attached to the casing 15 in such a manner that together they define an annular chamber 53. The chamber 53 contains a ring 54 which is located within the chamber 53 by means of a plurality of cross-pins 55, one of which can be seen in FIG. 4. The cross-pins 55 are located in aligned holes in the member 52 and the ring 54 so that they are generally parallel with the engine axis 24. The arrangement is such that the ring 54 may thermally expand and contract independently of the casing 15. The ring 54 is interconnected with the bosses 31 on each of the aerofoil vanes 25 by means of a plurality of generally radially extending bolts 56; one bolt 56 being attached to each boss 31. Each of the bolts 56 is provided with a bush 57 which serves to space apart each boss 31 from the ring 54. Each bush 57 passes through a corresponding hole 58 in the casing 15 and is provided with a portion 59 of smaller diameter than the remainder which locates in a hole of corresponding size in the boss 31.

The annular chamber 53 is adapted to be fed with air through a plurality of inlet pipes 60, each of which is associated with air flow regulator 61. The air passes around the ring 54 and is exhausted from the chamber 53 through a plurality of exhaust holes 62. The air can be either hot or cold and serves to control the dimensions of the ring 54 by thermal expansion and contraction. The air flow regulator 61 is controlled in the same manner as the air flow regulator 50 described earlier so that the ring 54 maintains the aerofoil vanes 25 and the support structure in a substantially constant state of tension.

The air supplied to the annular chamber 53 may be derived from any convenient source such as the compressor section 11 or combustion equipment 12 of the engine 10.

It is also envisaged that alternative means could be used to monitor the degree of tension in the aerofoil vanes 25 and the support member 19. More specifically the thermocouples 46, 47 and 48 (FIG. 3) could for instance be replaced by strain gauges 46', 47' and 48' (FIG. 3a).

I claim:

1. A turbine suitable for a gas turbine engine comprising:

a casing;
a support member enclosed within said casing and capable of a change in tension during operation of the turbine, said support member having a hub portion and a generally circular periphery, and said support member being symmetrically disposed about the axis of said turbine with the axis of said hub portion being coaxial with said turbine axis;
an annular array of radially extending stator aerofoil vanes capable of a change in tension during operation of the turbine, each of said stator aerofoil vanes being attached to both said casing and the periphery of said support member; and
tension maintenance means directly connected to at least one of said support member and said stator aerofoil vanes, said tension maintenance means comprises tensioning means for varying the tension in said support member and said stator aerofoil vanes, tension monitoring means for monitoring the degree of tension in each of said support member and said stator aerofoil vanes, and control means operatively associated with said tensioning means and responsive to said tension monitoring means, said control means being arranged to control said tension varying means in such a manner as to maintain said support member and said stator aerofoil vanes in a substantially constant state of tension during operation of the turbine.

2. A turbine as claimed in claim 1 wherein said tension monitoring means comprises temperature monitoring means coacting with said support member and said stator aerofoil vanes to monitor the temperatures thereof and computing means coacting with said temperature monitoring means to compute therefrom the degree of tension in said support member and said stator aerofoil vanes.

3. A turbine as claimed in claim 2 wherein said computing means is incorporated in said control means.

4. A turbine as claimed in claim 1 wherein said tension monitoring means comprises a plurality of strain gauges.

5. A turbine as claimed in claim 1 wherein said control means includes a microprocessor.

6. A turbine as claimed in claim 1 wherein said tensioning means comprises fluid flow regulating means for directing a flow of cooling fluid to said support member, said control means controlling said fluid flow regulating means in such a manner that the flow rate of cooling fluid directed onto said support member is such that the temperature of said support member is regulated in such a manner as to maintain said substantially constant state of tension in said support member and said stator aerofoil vanes.

7. A turbine as claimed in claim 6 wherein a shroud member is provided to encase at least a portion of said support member so that at least one chamber is defined adjacent said support member, said fluid flow regulating means being adapted to direct said cooling fluid into said at least one chamber to regulate the temperature of said support member.

8. A turbine as claimed in claim 7 wherein said shroud member is provided with a thermally insulating coating.

9. A turbine as claimed in claim 6 wherein said cooling fluid is air.

10. A turbine as claimed in claim 1 wherein tensile loading means is associated with each of said stator aerofoil vanes for exerting a variable tensile load thereon.

11. A turbine as claimed in claim 10 wherein said tensile loading means interconnects each of said stator aerofoil vanes with said turbine casing.

12. A turbine as claimed in claim 11 wherein said tensile loading means is a screw-jack.

13. A turbine as claimed in claim 11 wherein tensile loading means comprises a generally ring-shaped member, each of said stator aerofoil vanes being attached to said turbine casing via said ring-shaped member, said ring-shaped member being attached to said turbine casing by connecting means for permitting radial thermal expansion and contraction of said ring-shaped member independently of said turbine casing, and fluid flow regulating means for directing a supply of cooling or heating fluid onto said ring-shaped member, said control means controlling said fluid flow regulating means in such a manner that the flow rate of said cooling or heating fluid directed onto said ring-shaped member is such that the temperature of said ring-shaped member is regulated in such a manner that said aerofoil stator vanes and said support member are maintained in a substantially constant state of tension thereby.

14. A turbine as claimed in claim 13 wherein said turbine is provided with a hollow annular member within which said ring-shaped member is enclosed, said heating or cooling fluid being directed into the interior of said member.

15. A turbine as claimed in claim 14 wherein said ring-shaped member is located externally of said turbine casing.

16. A turbine as claimed in claim 13 wherein said cooling or heating fluid is air.

17. A turbine as claimed in claim 1 wherein said turbine is provided with at least one shaft and said support member carries at least one bearing member, said bearing member supporting said at least one shaft.

* * * * *